(12) United States Patent
Charles et al.

(10) Patent No.: US 9,015,246 B2
(45) Date of Patent: Apr. 21, 2015

(54) SESSION COLLABORATION

(71) Applicant: AetherPal Inc., South Plainfield, NJ (US)

(72) Inventors: Calvin Charles, Piscataway, NJ (US); Shine Joshua, Laurel, MD (US); Deepak Gonsalves, Bridgewater, NJ (US)

(73) Assignee: AetherPal Inc., South Plainfield, NJ (US)

(*) Notice: Subject to any disclaimer, the term of this patent is extended or adjusted under 35 U.S.C. 154(b) by 218 days.

(21) Appl. No.: 13/842,162

(22) Filed: Mar. 15, 2013

(65) Prior Publication Data
US 2013/0262581 A1 Oct. 3, 2013

Related U.S. Application Data

(60) Provisional application No. 61/617,843, filed on Mar. 30, 2012.

(51) Int. Cl.
G06F 15/173 (2006.01)
G06F 15/177 (2006.01)
H04L 29/06 (2006.01)

(52) U.S. Cl.
CPC .................. *H04L 65/1066* (2013.01)

(58) Field of Classification Search
USPC ................ 709/204, 223, 221, 218, 22, 245
See application file for complete search history.

(56) References Cited

U.S. PATENT DOCUMENTS

| 5,835,485 A * | 11/1998 | Grube et al. ............. 370/312 |
| 5,995,829 A | 11/1999 | Broderick |
| 5,999,521 A | 12/1999 | Thompson |
| 6,047,071 A | 4/2000 | Shah |
| 6,101,552 A * | 8/2000 | Chiang et al. ............. 709/245 |
| 6,144,849 A | 11/2000 | Nodoushani et al. |
| 6,148,197 A | 11/2000 | Bridges et al. |
| 6,201,964 B1 | 3/2001 | Tung et al. |
| 6,378,088 B1 | 4/2002 | Mongan |
| 6,516,188 B1 | 2/2003 | New et al. |
| 6,564,055 B1 | 5/2003 | Hronek |
| 6,615,038 B1 | 9/2003 | Moles et al. |
| 6,625,451 B1 | 9/2003 | LaMedica, Jr. et al. |
| 6,684,359 B2 | 1/2004 | Noy |
| 6,832,373 B2 | 12/2004 | O'Neill |
| 6,907,546 B1 | 6/2005 | Haswell et al. |

(Continued)

FOREIGN PATENT DOCUMENTS

| EP | 1429569 | 12/2003 |
| WO | WO2005001665 | 1/2005 |

OTHER PUBLICATIONS

Anonymous, "SyncML notification initiated session", Internet Citation, XP002462105, URL:http://www.openmobilealliance.org/tech/affiliates/syncml/syncml_dm_notification_v11_20020215.pdf, (Dec. 12, 2007).

(Continued)

*Primary Examiner* — Jude Jean Gilles

(74) *Attorney, Agent, or Firm* — Volpe and Koenig, P.C.

(57) ABSTRACT

A method of collaborating session management during remote control management with a mobile device which allows a Customer Service Representative to be able to share, transfer, and monitor their remote control sessions amongst other Customer Service Representatives without having to end the existing session.

30 Claims, 14 Drawing Sheets

(56) References Cited

U.S. PATENT DOCUMENTS

| | | |
|---|---|---|
| 6,925,405 B2 | 8/2005 | Adir et al. |
| 6,959,433 B1 | 10/2005 | Morales, Jr. et al. |
| 6,970,719 B1 | 11/2005 | McConnell et al. |
| 7,032,212 B2 | 4/2006 | Amir et al. |
| 7,194,264 B2 | 3/2007 | Li et al. |
| 7,286,802 B2 | 10/2007 | Beyme et al. |
| 7,805,719 B2 | 9/2010 | O'Neill |
| 2002/0029263 A1* | 3/2002 | Toyoshima et al. ........... 709/223 |
| 2003/0065738 A1 | 4/2003 | Yang et al. |
| 2003/0066065 A1 | 4/2003 | Larkin |
| 2003/0101246 A1 | 5/2003 | Lahti |
| 2003/0156549 A1 | 8/2003 | Binder et al. |
| 2003/0204726 A1 | 10/2003 | Kefford et al. |
| 2004/0098715 A1 | 5/2004 | Aghera et al. |
| 2005/0193098 A1 | 9/2005 | Khandpur et al. |
| 2005/0227688 A1 | 10/2005 | Li et al. |
| 2006/0015404 A1 | 1/2006 | Tran |
| 2006/0015626 A1 | 1/2006 | Hallamaa et al. |
| 2006/0075284 A1 | 4/2006 | Skan |
| 2006/0130046 A1 | 6/2006 | O'Neill |
| 2006/0136922 A1 | 6/2006 | Zimberg et al. |
| 2006/0248522 A1 | 11/2006 | Lakshminarayanan et al. |
| 2007/0005647 A1 | 1/2007 | Cugi et al. |
| 2007/0106564 A1 | 5/2007 | Matotek et al. |
| 2007/0299940 A1 | 12/2007 | Gbadegesin et al. |
| 2008/0098380 A1 | 4/2008 | Klusmeyer |
| 2008/0172736 A1 | 7/2008 | Barr et al. |
| 2008/0209193 A1 | 8/2008 | Zhang et al. |
| 2009/0164602 A1 | 6/2009 | Kies et al. |
| 2009/0177882 A1 | 7/2009 | Saran et al. |
| 2009/0221307 A1 | 9/2009 | Wolak et al. |
| 2009/0228966 A1 | 9/2009 | Parfene et al. |
| 2010/0070649 A1 | 3/2010 | Ng |
| 2010/0151823 A1 | 6/2010 | Dagorn et al. |
| 2010/0217780 A1 | 8/2010 | Erola et al. |
| 2011/0161533 A1* | 6/2011 | Lin ................................ 710/72 |
| 2011/0173235 A1* | 7/2011 | Aman et al. .................. 707/792 |
| 2012/0042252 A1* | 2/2012 | Neerudu et al. .............. 715/733 |
| 2013/0054969 A1 | 2/2013 | Charles et al. |

OTHER PUBLICATIONS

Kovacs, E. et al, "Integrating mobile agents into the mobile middleware", Internet article: http://download.springer.com/static/pdf/630/art%253A10.1007%252FBF01324936.pdf?auth66=1353975026_642152af85f26d0903f4dc786bdf1416&ext=.pdf>, p. 68-74, (Retrieved from Internet Nov. 26, 2012).

Caporuscio, M. et al, "Design and evaluation of a support service for mobile, wireless publish subscribe applications", 2003 IEEE, Internet article: http:ieeexplore.ieee.org/stamp/stamp.jsp?tp=&arnumber=1265521, 29:12, p. 1059-1071, (Retrieved from Internet Nov. 26, 2012).

* cited by examiner

SESSION COLLABORATION

PRIORITY CLAIM

In accordance with 37 C.F.R. §1.76, a claim of priority is included in an Application Data Sheet filed concurrently herewith. Accordingly, the present invention claims priority under 35 U.S.C. §§119(e), 120, 121, and/or 365(c) to U.S. Provisional Patent Application No. 61/617,843, entitled "REMOTE SESSION MANAGEMENT DURING A REMOTE CONTROL SESSION", filed on Mar. 30, 2012. The contents of which the above referenced application is incorporated herein by reference in its entirety.

FIELD OF INVENTION

The present invention relates to mobile wireless communication devices, systems, networks, and methods of operation and in particular a remote session management during a remote control session.

BACKGROUND OF THE INVENTION

During a Remote Control of a mobile device, Remote Session Management enables the Customer Service Representative (CSR) to collaborate with other experts or pass a remote control session to another expert in order to resolve the issues faster without losing any valuable time while the customer is still on a remote control session. Once the device is remotely controlled the CSR has the option to share the ongoing session with other Console users or pass the session control to another Console user without the need to disconnecting and reconnecting to the device. This feature also enables the supervisors to view one ongoing remote control sessions for the CSRs that are under their group.

SUMMARY OF INVENTION

The current invention allows the CSR to be able to share/transfer/monitor their remote control sessions amongst other CSRs or Supervisors without having to end the existing session.

An objective of the instant invention is to allow CSRs or any technician who is conducting a remote session would be able to share/transfer the session to another CSR without losing any time. This invention benefits the CSR/Supervisors in Customer care centers to share/transfer/monitor the remote control sessions to learn/provide better service to the customers. This invention enhances the ability of the CSRs to gain more insight into trouble shooting customer issues by collaborating with other CSRs. This invention significantly saves the customer time by not having to perform another remote control thereby improving the Average Holding Time (AHT).

Another objective of the instant invention is to permit training of other CSRs/technicians for trouble shooting customer issues on mobile devices.

Another objective of the instant invention is to permit supervisors to monitor the CSRs during the remote sessions so as to ensure the session is being handled correctly.

Yet still another objective of the instant invention is to help technicians/CSRs to collaborate to handle a customer remote control session if needed.

Still objective of the instant invention is to allow a CSR to transfer control to another CSR or some other technical resource, who would then continue the remote control session and try to trouble shoot the issue.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Figure 1:
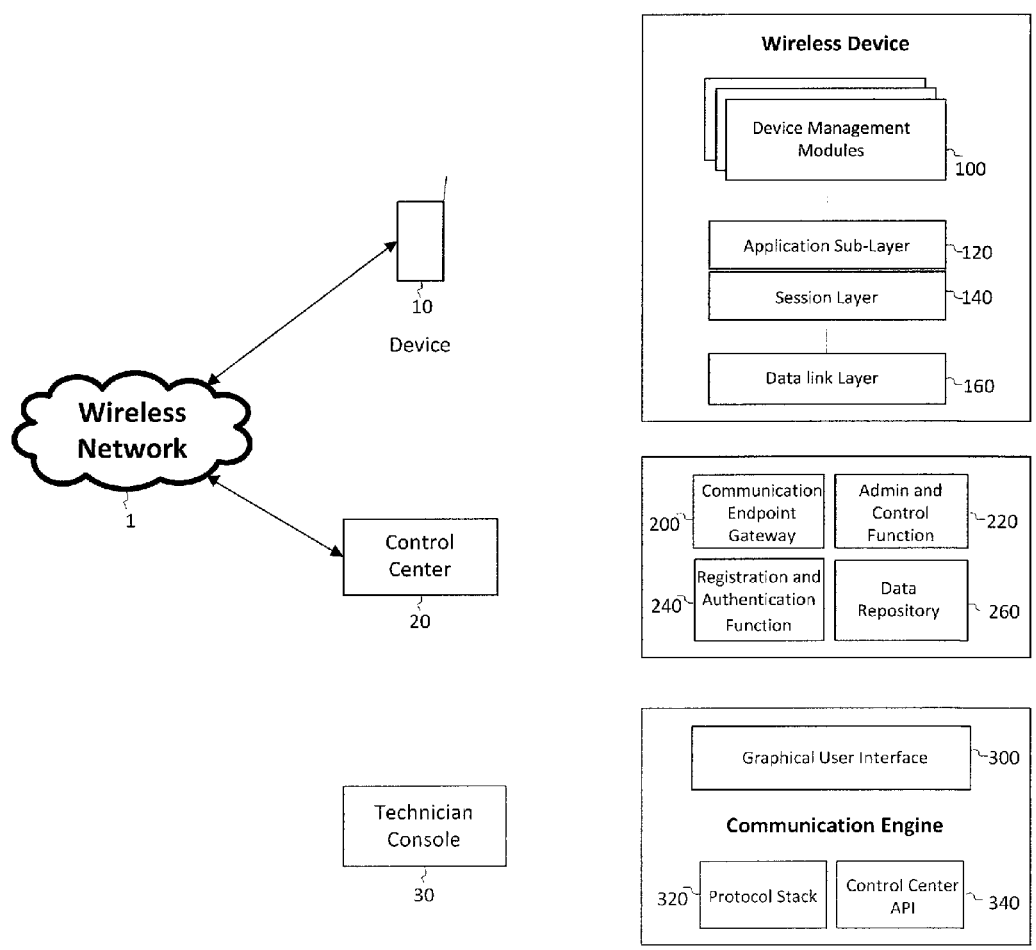
FIG. 1 illustrates the overall architecture of the Virtual Mobile Management (VMM) system.

Referring to FIG. 1, set forth is the overall architecture of the Virtual Mobile Management (VMM) system. For the purpose of readability, Blocks number starting with 1xx relates to Device [10] and it components; 2xx under refer to Control Center [20] and its components; 3xx under relate to Technician Console [30] and its components.

The Virtual Mobile Management Remote Control (VMM-RC) is a powerful tool designed to be used by the customer care representatives to remotely view and control the mobile devices. In a preferred embodiment, the key components of the VMM-RC system include: Technician Console [30] where care agents interact with the remote devices [10] through Control Center [20] services that mediate communication between the Technician Console [30] and the remote devices [10].

The Control Center [20] comprises the following elements:
Communication Endpoint Gateway or CEG [200]
Admin and Control Function or ACF [220]
Registration and Authentication Function or RAF [240]
Data Repository [260]

The primary responsibility of CEG [200] is to manage and mediate sessions. The server provides communication endpoints between device [10] and Technician Console [30]. This allows for multiple requests to be serviced within one session from multiple instances of [30]. The CEG or [200] provides a consistent manner of device connection and Tool service in a system with heterogeneous devices running different operating systems. The CEG or [200] provides load balancing across multiple Connection Handlers on each Communication End Point Gateway Server in order to minimize single point of failure.

Figure 2:
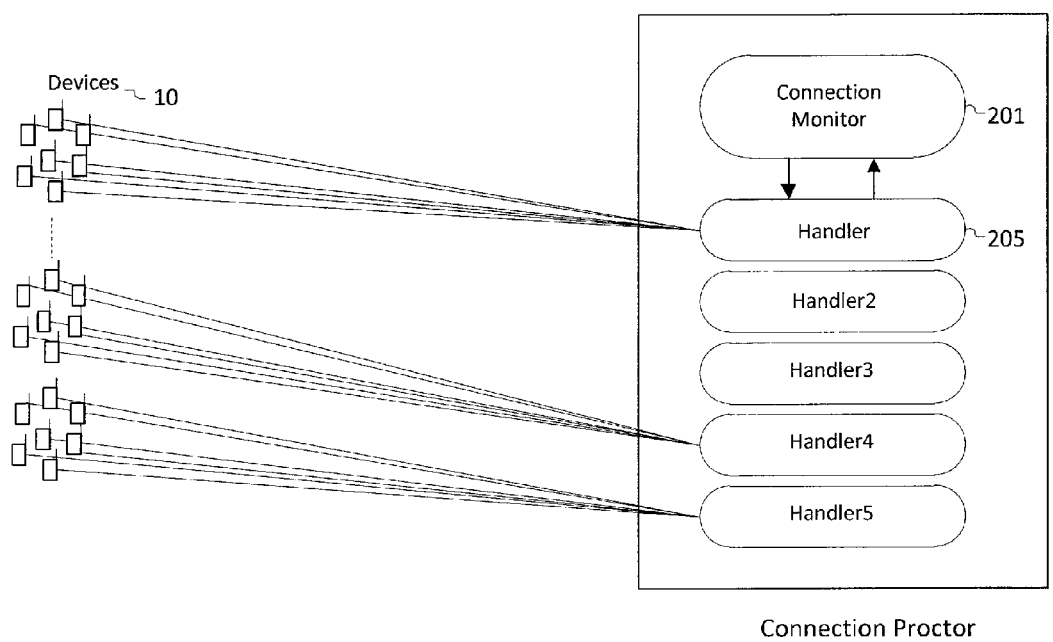
FIG. 2 illustrates the details of Communication Endpoint Gateway.

FIG. 2, shows components of CEG [200] in detail. CEG [200] is comprised of two components; the Connection Monitor and the Connection Handler [205].

The primary function of [201] is: Create and manage multiple instances of [205]; Creates Session ID for new connection requests; Monitors all the scheduled and existing sessions. The primary function of [205] is: authenticate inbound connections; mediate VMM session traffic between device [10] and Technician Console [30].

Figure 3:
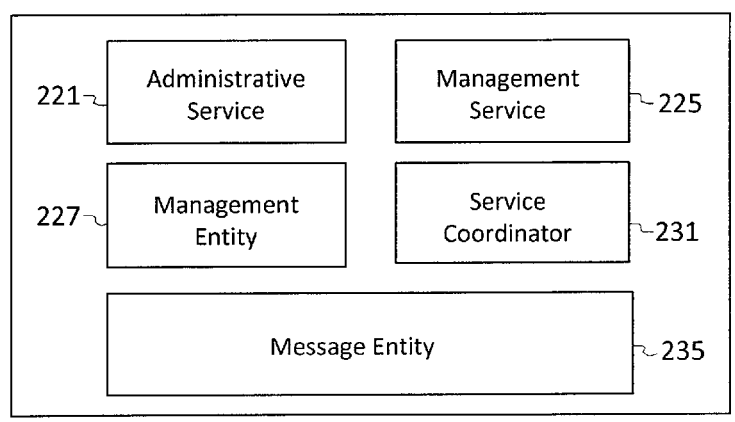
FIG. 3 illustrates the details of Admin and Control Function.

FIG. 3 shows the details of ACF [220] which is responsible in the administration, management and authorization of communication between the Control Center [20] and the devices [10]. It comprises of the following service functions.

The Administrative Service [221] is designed to be a central administrative entity of the entire virtual mobile management system. Through this service, system administrators perform administration, management and instrumentation servers within the system, create and maintain multiple tenants, assign tenant administrator roles, etc.

The Management Service [225] provides the operational endpoint to the system. The primary functions of Management Service are: Load distribution among the CEG, management of device registration; Administration of devices; Administration of users, zones, policies, roles, etc.; and Session Queuing.

The Management Entity [227] component is responsible in providing the Management service [225] with an in-memory data store for key operational data such as ACL, user/group/zone structures, etc.

The Service Coordinator [231] coordinates the communication between various elements within the System. It provides the database interface to the RAF [240] in the Control Center. All services register themselves with this service. This service is responsible for service discovery.

Figure 4:
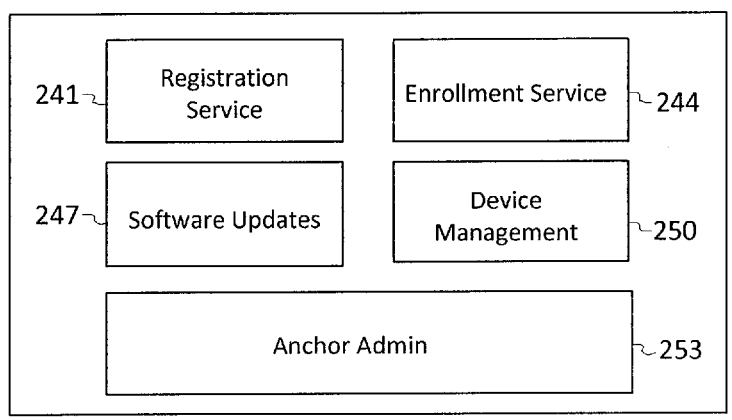
FIG. 4 illustrates the details of Routing and Authentication Function.

FIG. 4 shows the components of RAF [240] in detail; RAF [240] provides a single point of entry for all devices for enrollment and authentication services during VMM-RC session. It comprises of the following components:

Registration Service [241]: During Auto-Enrollment, devices are required to register themselves with this service, prior to enrolling themselves.

Enrollment Service [244]: This service is responsible to enroll registered devices with the system. The Enrollment process is defined in detail in the later sections of the document.

Software Updates [247]: This service manages the various client packages in the system. Devices connect to this service to request for client update. If an update is available, the service will provide the appropriate client download link.

Device Management [250]: This service provides the enrolled devices an interface to update its parameters in the system such as MDN when the device detects a change. AnchorAdmin [253]: This service provides the administration component.

Data Repository [260] is the data warehouse that stores the information about the VMM-RC Mobile devices, server configuration, tasks and status settings. These data bases are pivotal to configure and update managed devices and server components. It is also responsible to maintain the user login information as well as device authentication information.

Figure 5:
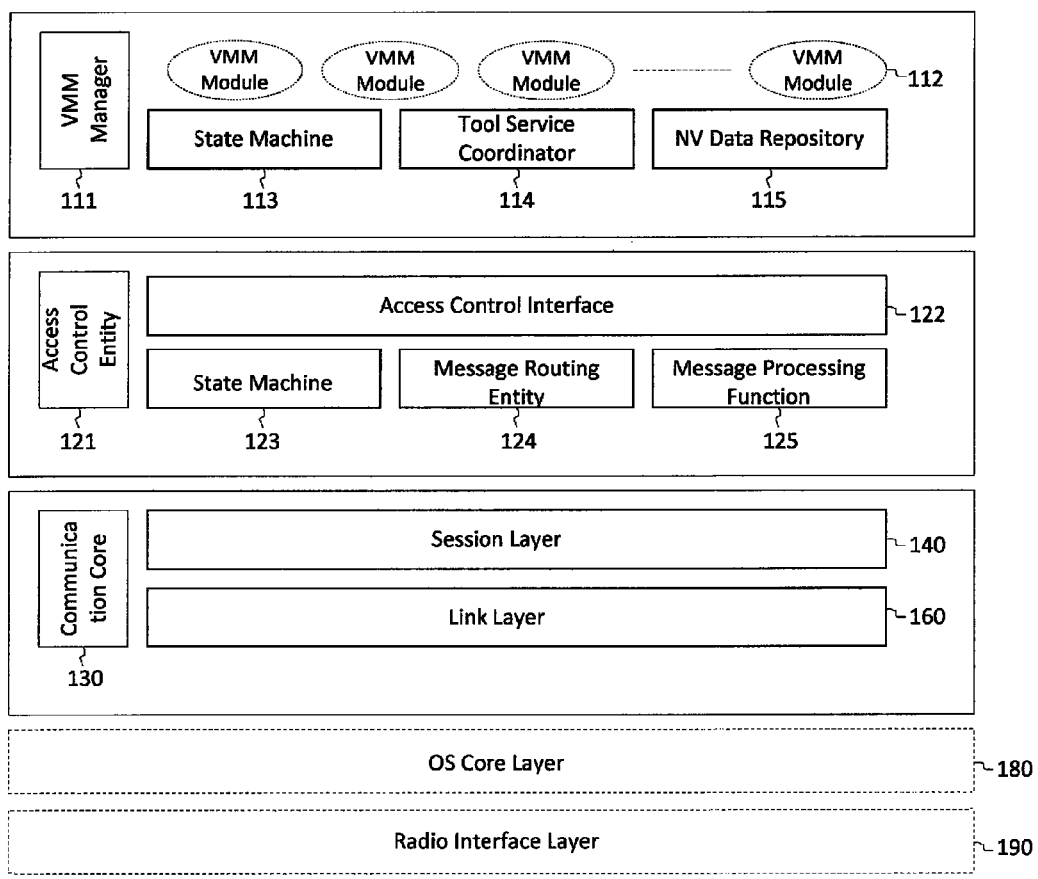
FIG. 5 illustrates the VMM client protocol architecture of Device.

FIG. 5 illustrates the VMM client protocol architecture of Device [10]. The VMM Client architecture comprises of the following protocol layers and function blocks VMM Manager [111] this layer encapsulates functional entities that provide the communication and protocol frameworks necessary to client services. This layer primarily handles bearer plane traffic. The following functional entities are part of [111].

VMM Modules [112] provide a multitude of tool services. Tool Services are grouped together that exhibit common functionality such as Remote Control, File Manager, Device Management, etc.

State Machine [113], each tool service maintains an instance of the state machine. A State Machine defines a set of shared states that the tool service on the device application shares with the server.

Tool Service Coordinator [114] maintains a collection of active tool service instances that are currently being serviced by the VMM application. This entity maintains the lifetime of all Tool Services, and is responsible in creating and destroying Tool Services.

NV Data Repository [115] authentication and authorization specific data that is shared between the VMM application and the server is maintained within the NV data repository. This data repository also serves the purpose of maintaining Tool Service configuration as well as VMM configuration data.

Access Control Entity [121] layer provides a set of functions to the Tool Services to communicate with the Control Center [20]. It provides in the encapsulation of messages before forwarding it to the Communication Core [130]. This layer is responsible to invoke an instance of the Communication Core [130] layer and provides a state machine [123] that defines the state of the VMM application.

Access Control Interface [122] provides a set of standard Application Programmer Interface or API to the Tool Services. These APIs provide a consistent communication platform to facilitate both synchronous as well as asynchronous communication.

State Machine [123] identifies the overall state of the VMM application. State transitions within the ACE State Machine triggers events that are handled by the VMM layer. The states are Open and Closed. Traffic flows through the ACI layer only in the State Open.

Message Routing Entity [124] is responsible for routing all signal messages, destined to Tool Services to the respective event handlers.

Message Processing Function [125] is a signal message pre-processor. This entity receives signal messages from the Session Layer destined towards Tool Services. It de-frames these messages prior to forwarding it to the Message Routing Entity to apply routing rules. Messages that are destined for the server from Tool Services are encapsulated here.

Communication Core [130] Layer is responsible to set up and maintain a dedicated communication channel with the Control Center [20]. This layer provides the necessary framework to transport messages between the upper layers and the Control Center [20]. It provides message encapsulation, framing, fragmentation and packet re-construction of Tool Service messages.

Figure 6:
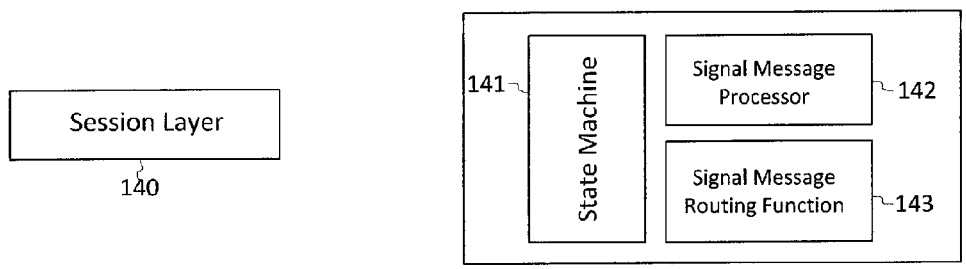
FIG. 6 illustrates the details of VMM Client Session Layer.

The communication core [130] comprises of the following sub-layers. FIG. 6 is a detail of Session Layer [140]. The session layer maintains a set of shared state between the Communication Endpoint Gateway (CEG) [200] and the VMM Application Module [112]. The session layer packets encapsulate signal messages that are transported between the CEG [200] and the VMM Module [112]. Each message within the session layer packet defines the source and destination to which the signal messages are to be delivered. The session layer consists of the following entities.

State Machine [141] maintains a state within a pre-defined set of shared state between the application and the CEG [200]. State changes within the state machine trigger the execution of state transition procedures within the VMM Application Module [112].

Signal Message Processor [142] is responsible to encapsulate and process signal messages that are transmitted between the CEG [200] and the Application Module [112]. This entity is also responsible in influencing the state transition within the state machine by altering its state. Signal messages destined to VMM modules are forwarded to the Signal Message Routing Function.

Signal Message Routing Function [143] is responsible with the task of forwarding signal messages to the appropriate destination. Signal messages destined to VMM modules are directly forwarded to the VVM Tool Service Coordinator [114]. Signal messages destined to the CEG [200] are forwarded to the link layer [160].

Referring to FIG. 5, another component is the Link Layer [160] which is responsible to establish and maintain a dedicated communication channel between the client and the CEG [200]. The Link Layer encapsulates all messages within its frame prior to forwarding it to the network. Packets that are received by the Link Layer from the network are re-constructed and de-framed prior to forwarding it to the upper layer. This layer checks for message integrity.

Figure 7:
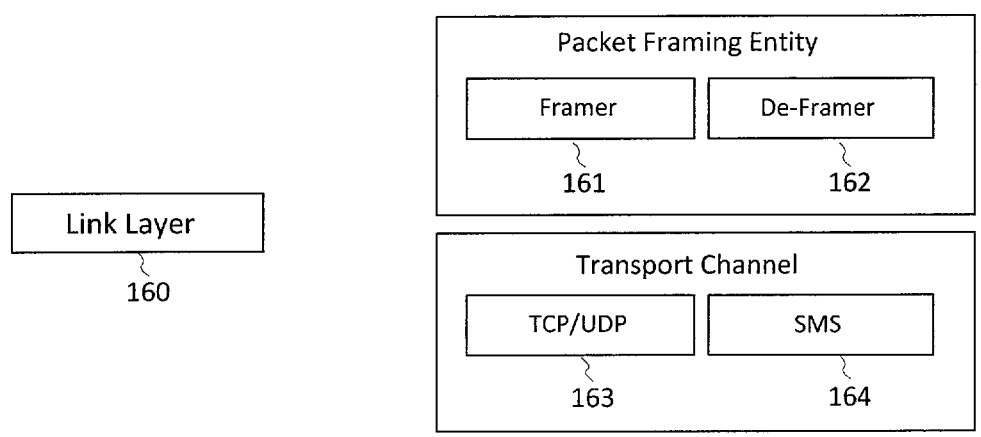
FIG. 7 illustrates the details of the VMM Client Link Layer.

The following components form the Link Layer [160] as in FIG. 7, (Detail of Link Layer in FIG. 5). The Packet Framing Entity [161, 162] is responsible to encapsulate messages in Link Layer frames. These frames are then forwarded to the Transport Channel, to be forwarded to the network layer. The packet framing entity comprises of Framer [161] and the De-Framer [162]. When a network packet is received by the Packet Framing Entity, it inspects the packet and verifies the integrity of the packet. Malformed packets are silently discarded.

The Transport Channel [163, 164] binds to the appropriate transport layer of the underlying operating system, which is dependent upon the VMM Tool Service. It is responsible to forward messages to the network layer and receives messages from the network layer. It provides notification to the upper layer of the state of the network layer through asynchronous events.

Figure 8:
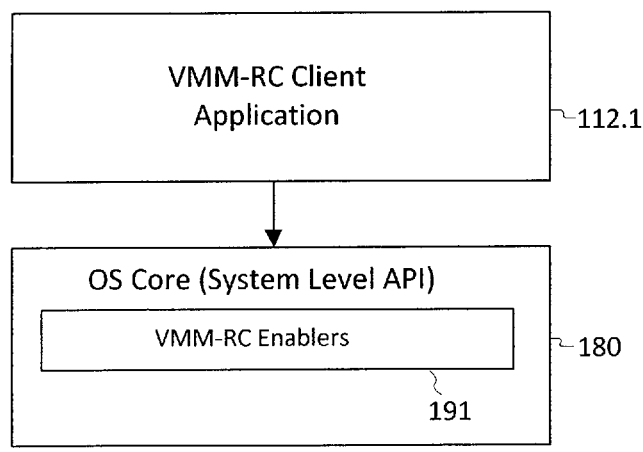
FIG. 8 is a schematic diagram of Virtual Mobile Management-Remote Control VMM-RC on Client side.

FIG. 8 shows is a schematic diagram of Virtual Mobile Management-Remote Control VMM-RC on Client side. The VMM-RC client Application [112.1] on the device provides Core Tool services, to manage the remote control session, collect the desired device diagnostics, provide self-care support for remote session activation and manage security protocol. The VMM-RC client application module [112.1] is one of the many VMM Client Application modules of [112]

The key features that are required by VMM-RC application to manage devices remotely include: Display Capture, this method involves the capturing of the device screen; Key event Injection, this method involves the injection of key events into the device screen; Touch event injection, this method involves the simulation of touch events on the device screen; and Device Information, getting the device information like network, power status, MNC, MCC, IMEI, IMSI, ESN, battery level of the smart phone etc., this is of value to the remote technician.

The VMM-RC Enabler [191] performs the key functions: Intercepts all the SMS; keeps the VMM-RC Application to its current version; if the VMM-RC Application is removed accidentally the VMM-RC Enabler shall connect to the server and download the application and installs the same.

Figure 9:
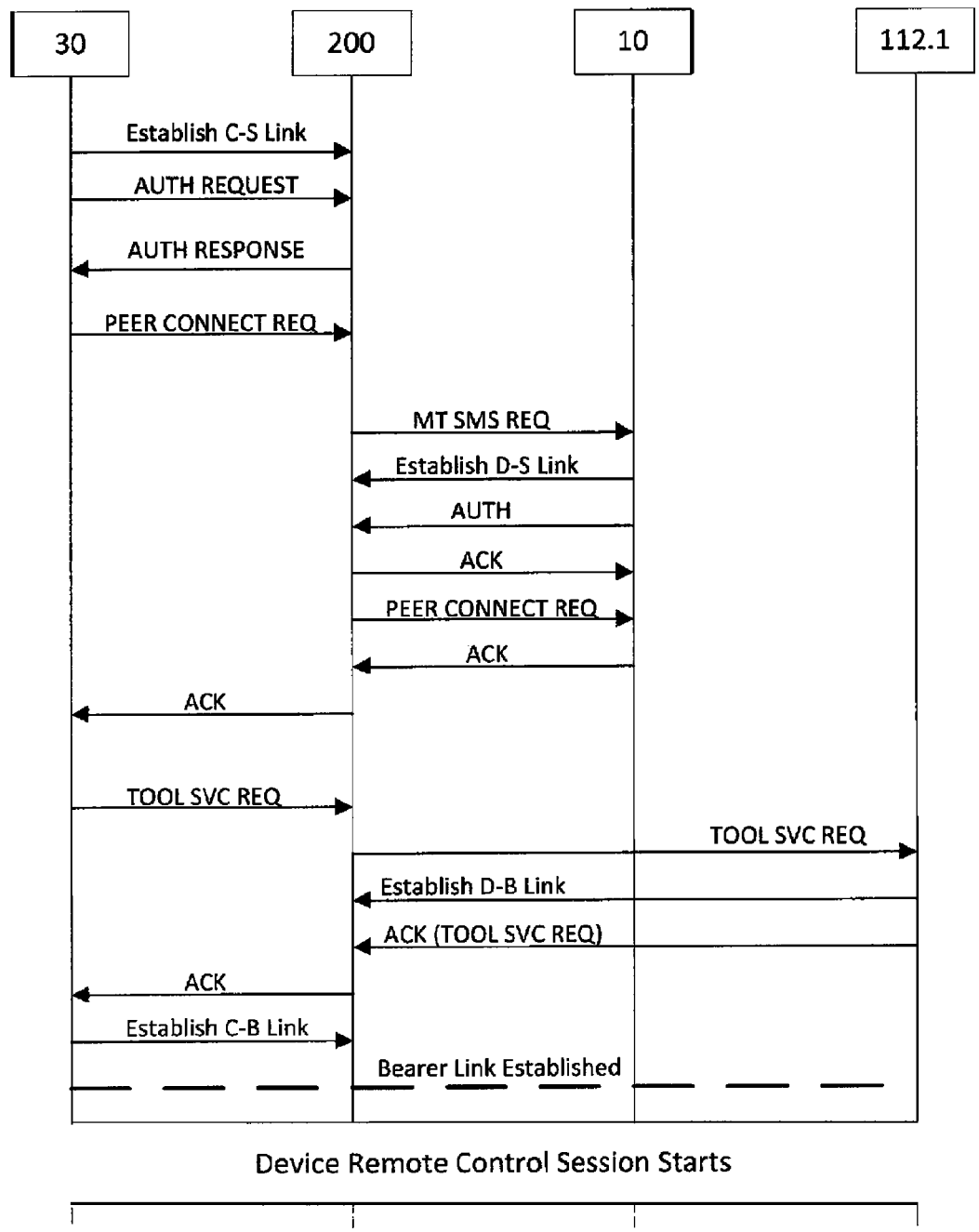
FIG. 9 illustrates the overall process of End-to-End VMM-RC Session establishment.

FIG. 9 illustrates the overall process of End-to-End VMM-RC Session establishment.

(a) CEG [200] receives C-S link connection request from Technician Console [30];
(b) Authentication Request is received by CEG [200] from the Technician Console [30];
(c) Authentication Response is sent by [200] to [30];
(d) PEER_CONNECT_REQ signal is received by [200] from [30];
(e) [200] sends a Mobile Terminated SMS to Device [10];
(f) [200] receives D-S link connection request from Device [10];
(g) Authentication Request is received by [200] from Device [10];
(h) Authentication Response is sent by [200] to Device [10];
(i) PEER_CONNECT_REQ signal sent by [200] to Device [10];
(j) ACK received by [200] from [10];
(k) ACK transmitted by [200] to Technician Console [30];
(l) TOOL_SVC_REQ received by [200] from [30];
(m) TOOL_SVC_REQ relayed by [200] to VMM RC [112.1];
(n) [200] receives D-B link connection from [112.1];
(o) [200] receives ACK from [112.1] for the TOOL_SVC_REQ for step (m);
(p) ACK relayed by [200] to [30];
(q) [200] receives C-B link connection request from [30].

At this point, the control plane and bearer plane is/are established. VMM-RC bearer data is carried over the bearer channels (D-B and C-B)

Figure 10:
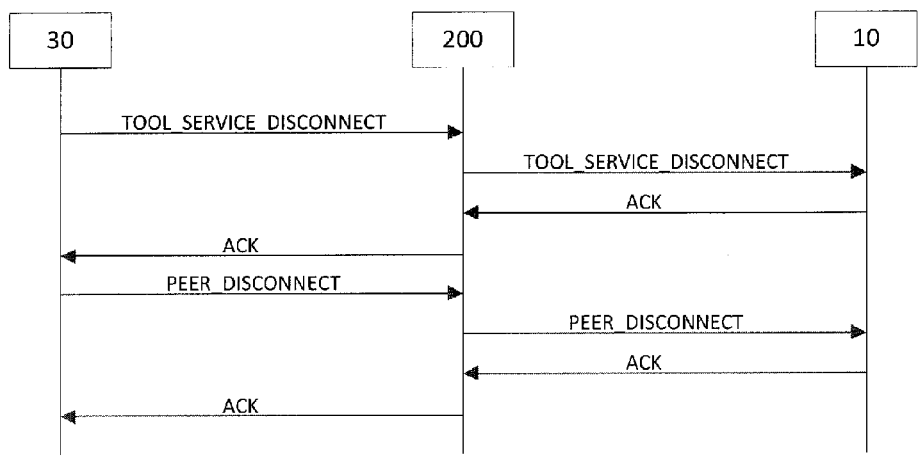
FIG. 10 illustrates the overall process of VMM-RC Session termination.

VMM-Remote Session Termination, referring to FIG. 10, the Technician, operating the Technician Console [30] initiates the VMM-RC service disconnection. The following sequence of events occurs:

(a) TOOL_SVC_DISCONNECT is received from Technician Console [30] by CEG [200];
(b) TOOL_SVC_DISCONNECT is relayed by [200] to Device [10];
(c) ACK is received by [200] from [10];
(d) ACK is relayed by [200] to Technician Console [30];
(e) PEER_DISCONNECT is received from Technician Console [30] by CEG [30];
(f) PEER_DISCONNECT is relayed by [200] to Device [10];
(g) ACK is received by [200] from [10]; and
(h) ACK is relayed by [200] to Technician Console [30].

At this time, all channels are disconnected and the VMM-RC session is closed.

The instant invention allows CSR's or any technician who is conducting a remote session to share or transfer the session to another CSR without losing any time. This benefits the CSR and Supervisors in Customer care centers to share/transfer/monitor the remote control sessions to provide better service to the customers. The ability of the CSR's gains more insight into trouble shooting customer issues by collaborating with other CSR's. This invention significantly saves the customer time by not having to perform another remote control thereby improving the Average Holding Time.

Figure 11:
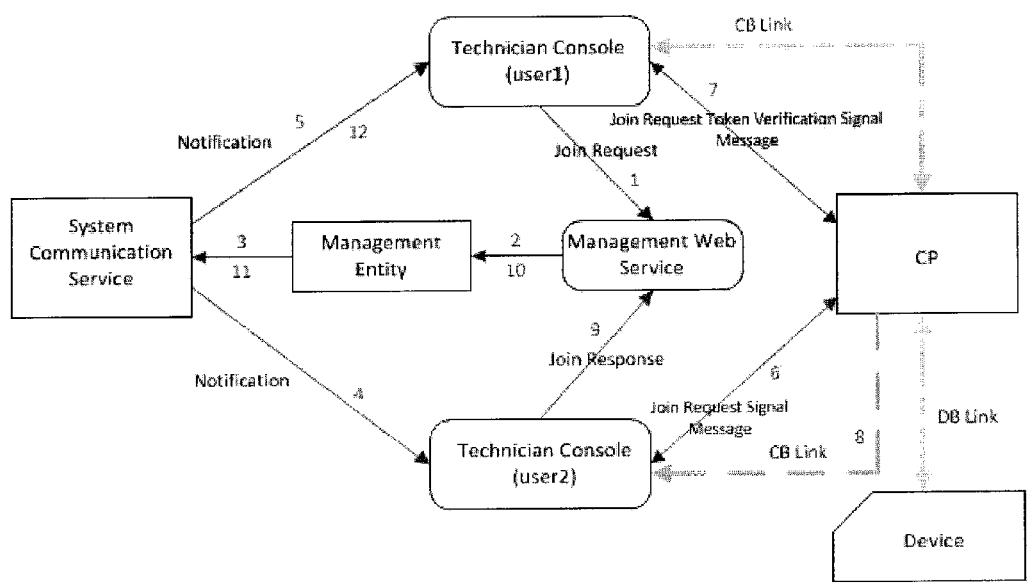
FIG. 11 describes the Join Request process during Session Collaboration.

FIG. 11 describes the Join Request mode of Session Collaboration

Actors: Technician-1; Technician-2
Pre-Condition: Technician 1 has a pre-established VMM-RC session with Device [10]. Technician-1 intends to invite Technician-2 to the session.

(1) Technician Console [30] of Technician-1 sends JOIN_REQ command to Management Service [225]

(2) Management Service [225] forwards the request to Management Entity [227]

(3) Management Entity [227] forwards the request to Collaboration Service [240]

(4) [240] creates a COLLABORATION_TOKEN (CT) and forwards the request to [30] of Technician-2

(5) Upon acceptance by Technician-2, COLLABORATION_TOKEN (CT) is forwarded to Technician Console [30] of Technician-1

(6) Technician Console [30] of Technician-2 establishes C-S link with CEG[200] and sends JOIN_REQ Signal Message with CT (7) Technician Console [30] of Technician-1 validates CT (8) Technician Console [30] of Technician-2 establishes Control-Bearer (C-B) link with CEG [200]

CEG [200] now relays all bearer traffic from device to Technical Console [20] of Technician-1 and Technician-2.

Figure 12:
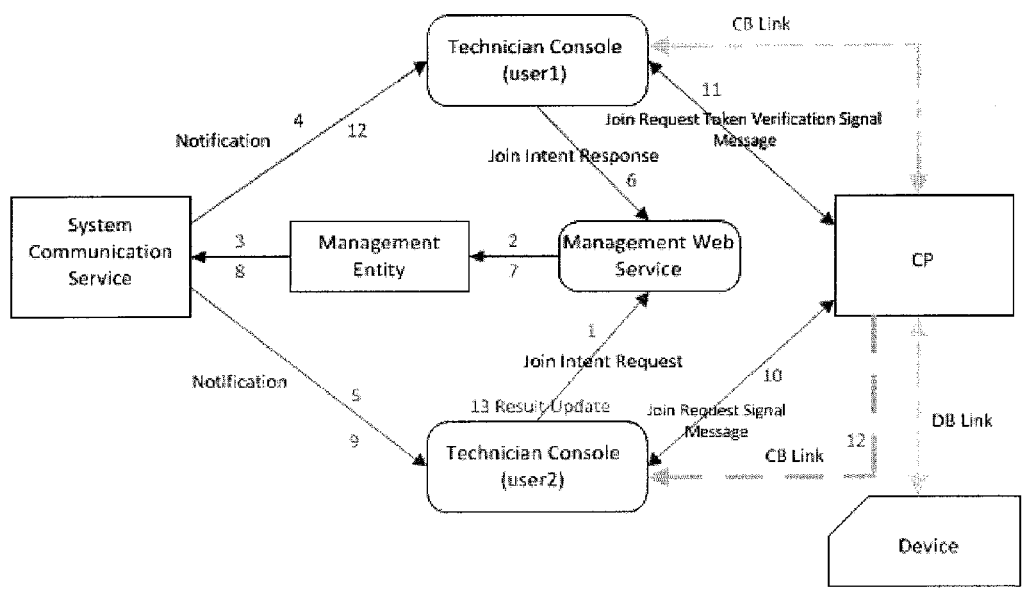
FIG. 12 describes the Join Intent Request process during Session Collaboration.

FIG. 12 describes the Join-Intent Request mode of Session Collaboration

Actors: Technician-1; Technician-2

Pre-Condition: Technician 1 has a pre-established VMM-RC session with Device [10]. Technician-2 intends to join the session.

(1) Technician Console [30] of Technician-2 sends Join_Intent_Request (JIR) command to Management Service [225]

(2) Management Service [225] forwards the JIR to Management Entity [227]

(3) Management Entity [227] forwards the JIR to Collaboration Service [240]

(4) [240] notifies the Technician Console [30] of Technician-1 of the Join_Intent_Request (JIR).

(5) [240] notifies Technician-2 on the result of the JIR.

(6) Technician Console [30] of Technician-1 sends JOIN_REQ (JR) command to Management Service [225] as a result of JIR (7) Management Service [225] forwards the JR request to Management Entity [227]

(8) Management Entity [227] forwards the request to Collaboration service [240]

(9) [240] creates a COLLABORATION_TOKEN (CT) and forwards the request to [30] of Technician-2

(10) Technician Console [30] of Technician-2 establishes C-S link with CEG[200] and sends JOIN_REQ Signal Message with CT

(11) Technician Console [30] of Technician-1 validates CT

(12) Technician Console [30] of Technician-2 establishes Control-Bearer (C-B) link with CEG [200]

(13) Technician Console [30] of Technician-2 updates the JIR state.

CEG [200] now relays all bearer traffic from device to Technical Console [20] of Technician-1 and Technician-2

Figure 13:
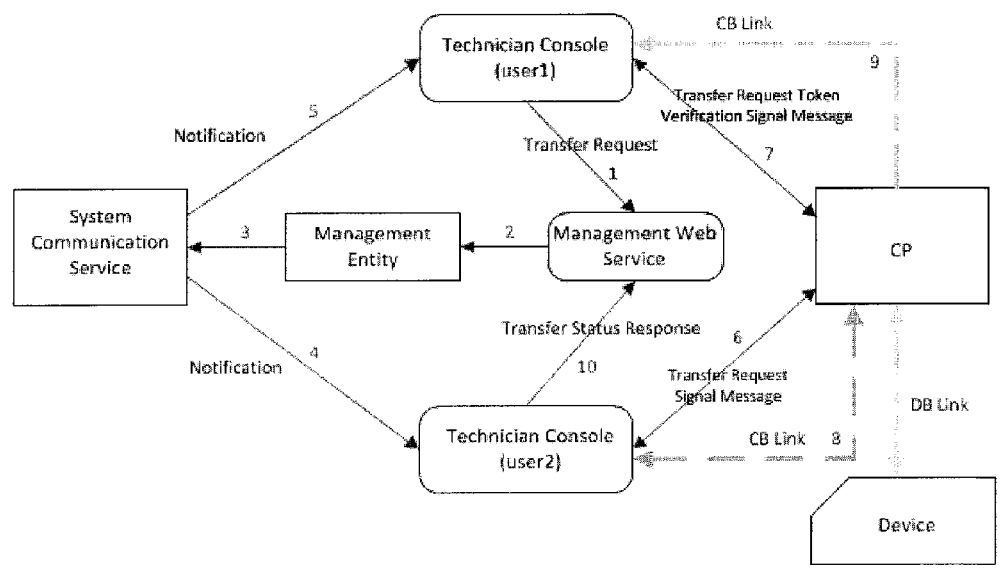
FIG. 13 describes the Transfer_Request process during Session Collaboration.

FIG. 13 describes the Transfer_Request mode of Session Collaboration

Actors: Technician-1; Technician-2

Pre-Condition: Technician 1 has a pre-established VMM-RC session with Device [10]. Technician-1 intends to transfer the session to Technician-2.

(1) Technician Console [30] of Technician-1 sends Transfer_Request (TR) command to Management Service [225]

(2) Management Service [225] forwards the request to Management Entity [227]

(3) Management Entity [227] forwards the request to Collaboration Service [240]

(4) [240] creates a COLLABORATION_TRANSFER_TOKEN (CTT) and forwards the request to [30] of Technician-2

(5) Upon acceptance by Technician-2, COLLABORATION_TRANSFER_TOKEN (CTT) is forwarded to Technician Console [30] of Technician-1

(6) Technician Console [30] of Technician-2 establishes C-S link with CEG [200] and sends TRANSFER_REQ Signal Message with CTT (7) Technician Console [30] of Technician-1 validates CTT (8) Technician Console [30] of Technician-2 establishes Control-Bearer (C-B) link with CEG[200]

(9) Technician Console [30] of Technician-1 now disconnects from the session

(10) Technician Console [30] of Technician-2 sends Transfer_Status_Response (TSR) to Management Service [225].

Post-Condition

CEG [200] now relays all bearer traffic from device to Technical Console [20] of Technician-2, who is now the owner of the session.

Figure 14:
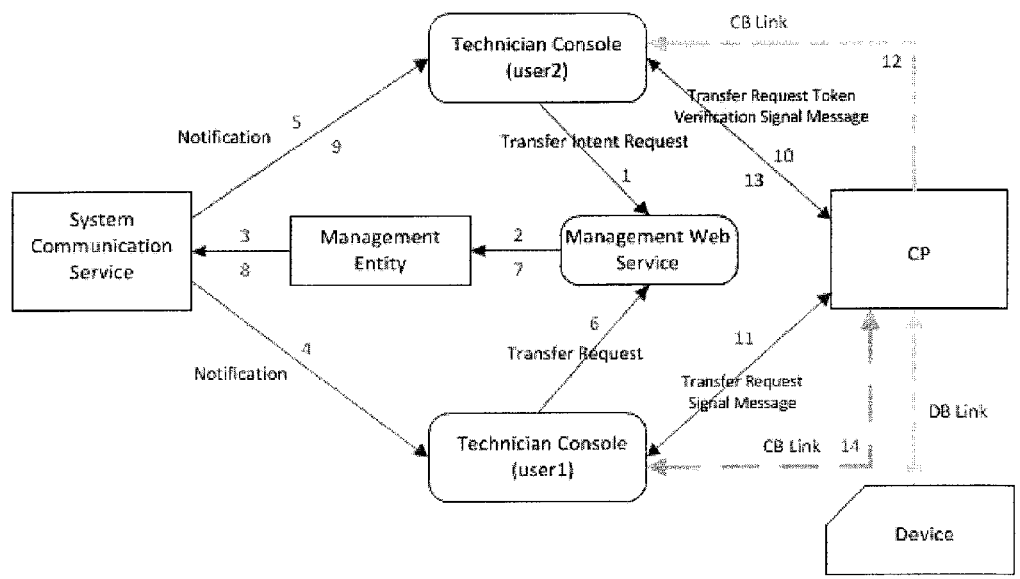
FIG. 14 describes the Transfer Intent Request process during Session Collaboration.

FIG. 14 describes the Transfer-Intent_Request mode of Session Collaboration

Actors: Technician-1; Technician-2

Pre-Condition: Technician 1 has a pre-established VMM-RC session with Device [10]. Technician-2 intends to request to be the owner of the session.

(1) Technician Console[30] of Technician-2 sends Transfer_Intent_Request (TIR) command to Management Service [225]

(2) Management Service [225] forwards the TIR to Management Entity [227]

(3) Management Entity [227] forwards the TIR to Collaboration Service [240]

(4) [240] notifies the Technician Console [30] of Technician-1 of the TIR.

(5) [240] notifies Technician-2 on the result of the JIR.

(6) Technician Console [30] of Technician-1 sends Transfer_Req (TR) command to Management Service [225] as a result of TIR (7) Management Service [225] forwards the TR request to Management Entity [227]

(8) Management Entity [227] forwards the request to Collaboration service [240]

(9) [240] creates a COLLABORATION_TRANSFER_TOKEN (CTT) and forwards the request to [30] of Technician-2

(10) Technician Console [30] of Technician-2 establishes C-S link with CEG[200] and sends TRANSFER_REQ Signal Message with CTT

(11) Technician Console [30] of Technician-1 validates CTT

(12) Technician Console [30] of Technician-2 establishes Control-Bearer (C-B) link with CEG [200]

(13) Technician Console [30] of Technician-2 updates the TIR state.

(14) Technician Console [30] of Technician-1 now disconnects from the session.

Post-Condition

CEG [200] now relays all bearer traffic from device to Technical Console [20] of Technician-2, who is now the owner of the session.

Use Case 1: Transfer remote session to another CSR. A CSR that already has an active device remote control session would like to pass the control of the device to another CSR.

(1) CSR controlling the remote session clicks on Transfer Session.

(2) Console displays the User Search window where the CSR can type the Target CSR e-mail to find the Console user logged in or selects the logged in user from the list shown on the search window.

(3) Upon selection of the Target CSR, the Console on the Target CSR screen shows a pop-up window requesting a transfer of an active remote control session from another CSR.

(4) If Target CSR accepts the request then the session on the Source CSR Console is terminated and the session on the Target CSR Console initiated. This action will not require any subscriber acceptance and will be done automatically.

(5) If Target CSR rejects the request then the session will still remain with Source CSR.

(6) If Session Control transfer is successful, then session associated with the Source CSR is marked as Transfer Out and Target CSR session is marked as session Transfer In with the time stamps.

Use Case 2: Share remote session viewing with another CSR—A CSR that already has an active device remote control session would like another CSR to view the same Console that the current CSR is viewing.

(1) CSR controlling the remote session clicks on View Session with Another CSR.

(2) Console displays the User Search window where the CSR can type the Target CSR e-mail to find the Console user logged in or selects the logged in user from the list shown on the search window.

(3) Upon selection of the Target CSR, the Console on the Target CSR screen shows a pop-up window indicating that another CSR would like to share their Console screen for a specific remote control session.

(4) If Target CSR accepts the request then a window within the Target CSR's Console is created where the remote session screen of the Source CSR Console is shown. The Target CSR cannot control the session and can only view the session. On the Source CSR's Console there is an indicator with the CSR e-mail that the screen is being shared. This action will not require any subscriber acceptance and will be done automatically.

(5) If Target CSR rejects the request then the session will still remain with Source CSR without sharing the screen.

Use Case: Terminate shared remote session viewing—A CSR that is sharing a remote control session viewing with another CSR would like to terminate the viewing. The viewing can also be terminated by the Target CSR.

(1) CSR controlling the remote session that initiated the Remote Control view sharing clicks on Terminate Shared Viewing Session with Another CSR.

(2) The viewing in the Target CSR is terminated and a notification on the Target CSR's Console.

Use Case 3: Monitor an ongoing remote control session—A supervisor would like to monitor ongoing remote control sessions that are managed by CSRs within supervisor's group. The supervisor would be able to view the list of ongoing sessions and select the desired sessions to view in real-time the activities that already in progress.

(1) Supervisor within the Console has an Active Session Summary window that contains the list of active sessions with the CSR's e-mail address, session id and session start time.

(2) Supervisor selects a session to view and the selected session window opens within the Supervisor's Console. At this point the CSR Console indicates that the Console is also being viewed by the Supervisor (providing the e-mail address).

(3) Supervisor may select as many as 10 remote sessions to view concurrently.

(4) Supervisor may terminate viewing of the CSR's Console session by closing the Session View Window. At this point on CSR's screen notification appears informing that the Supervisor has terminated the viewing the session.

(5) The Supervisor's viewing of the specific session may also terminate if the CSR terminates the Remote Control session with the device.

It is to be understood that while a certain form of the invention is illustrated, it is not to be limited to the specific form of arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments. Indeed, various modifications of the described modes for carrying out the invention which are obvious to those skilled in the art are intended to be within the scope of the following claims.

What is claimed is:

1. A method of session transfer during a remote management session with a mobile device, the method comprising:
    initiating a session transfer for a remote management session;
    displaying a user search window on a source console to identify a target console;
    selecting the target console and displaying a transfer request on the target console; and
    terminating the remote management session on the source console upon transfer to the target console.

2. The method according to claim 1, wherein upon successful session control transfer, the remote management session associated with the source console is indicated as transferred out and the remote management session with the target console is marked as transferred in.

3. The method according to claim 1, wherein a rejection by the target console causes the remote management session to remain with the source console.

4. The method according to claim 1, wherein the remote management session is end user initiated.

5. The method according to claim 1, wherein the remote management session is console initiated.

6. A method of session transfer during a remote management session with a mobile device, the method comprising:
    selecting a target console associated with a target remote management session;
    sending a session transfer request to the target console; and
    terminating the remote management session on the target console upon transfer to a source console.

7. The method according to claim 6, wherein upon successful session control transfer, the remote management session associated with the target console is indicated as transferred out and the remote management session with a source console is marked as transferred in.

8. The method according to claim 6, wherein a rejection by the target console causes the remote management session to remain with the target console.

9. The method according to claim 6, wherein the remote management session is end user initiated.

10. The method according to claim 6, wherein the remote management session is console initiated.

11. A method of collaborating session management during remote control management with a mobile device, the method comprising:
 displaying a user search window on a source console to locate a target console;
 selecting a target console for session collaboration; and
 receiving an acceptance by the target console, wherein a window is formed within the target console to show a specific remote management session screen of the source console.

12. The method according to claim 11, wherein the source console provides an indicator that the screen is being shared.

13. The method according to claim 11, wherein a rejection by the target console maintains the remote management session with the source console without sharing the specific remote management session screen.

14. The method according to claim 11, wherein the acceptance by the target console shows the specific remote management screen on the target console and the source console.

15. The method according to claim 11, wherein the remote management session is end user initiated.

16. The method according to claim 11, wherein the remote management session is console initiated.

17. A method of collaborating session management during remote control management with a mobile device, the method comprising:
 displaying a user search window on a source console to locate a target remote management session;
 selecting a target console associated with the target remote management session for session collaboration; and
 receiving an acceptance from the target console, wherein a window is formed within the source console to show a specific remote management session screen of the target console.

18. The method according to claim 17, wherein the source console provides an indicator that the screen is being shared.

19. The method according to claim 17, wherein a rejection from the target console maintains the remote management session with the target console without sharing the specific remote management session screen.

20. The method according to claim 17, wherein the acceptance by the target console shows the specific remote management screen on the target console and the source console.

21. The method according to claim 17, wherein the remote management session is end user initiated.

22. The method according to claim 17, wherein the remote management session is console initiated.

23. A method of monitoring during remote control management with a mobile device, the method comprising:
 viewing an active session summary window that contains a list of active sessions;
 selecting at least one session to view; and
 opening a session view window for each selected session within a monitoring console.

24. The method according to claim 23, further comprising:
 sending a monitoring indicator to a console associated with each selected session.

25. The method according to claim 23, further comprising:
 sending another monitoring indicator to a console associated with each selected session upon termination of monitoring.

26. The method according to claim 23, further comprising:
 closing the session view window terminates viewing of the selected session.

27. The method according to claim 23, wherein monitoring of the selected session terminates upon termination of the remote management session with the mobile device.

28. The method according to claim 23, further comprising:
 selecting a session for session collaboration; and
 receiving an acceptance by a target console, wherein a window is formed within the monitoring console to show a specific remote management session screen of the target console.

29. The method according to claim 23, further comprising:
 initiating a session transfer for a session;
 sending a session transfer request to a target console associated with the session; and
 terminating the remote management session on the target console upon acceptance by the target console.

30. The method according to claim 23, wherein the monitoring console takes ownership of the session.

* * * * *